United States Patent [19]
Menadue et al.

[11] Patent Number: 5,671,434
[45] Date of Patent: Sep. 23, 1997

[54] MICROPROCESSOR CONTROLLED APPARATUS

[75] Inventors: Andrew Menadue, Truro; Ian Withycombe, Farnborough, both of United Kingdom

[73] Assignee: Nokia Mobile Phones Ltd., Salo, Finland

[21] Appl. No.: 478,551

[22] Filed: Jun. 7, 1995

Related U.S. Application Data

[63] Continuation of Ser. No. 16,804, Feb. 11, 1993, abandoned.

[30] Foreign Application Priority Data

Mar. 24, 1992 [GB] United Kingdom ............... 9206319

[51] Int. Cl.$^6$ .................................. G06F 13/00; G06F 3/14
[52] U.S. Cl. .................. 395/800; 361/239; 361/239.9; 361/240; 361/240.1; 361/240.3; 361/241.9
[58] Field of Search .................. 395/800; 364/DIG. 1, 364/DIG. 2, 239, 240, 241.9, 240.1, 239.9, 240.3

[56] References Cited

U.S. PATENT DOCUMENTS

| | | | |
|---|---|---|---|
| 4,486,833 | 12/1984 | Daudelin | 364/200 |
| 4,713,748 | 12/1987 | Magar et al. | 364/200 |
| 4,713,749 | 12/1987 | Magar et al. | 364/200 |
| 5,125,088 | 6/1992 | Culley | 395/500 |
| 5,247,636 | 9/1993 | Minnick et al. | 395/425 |
| 5,337,068 | 8/1994 | Stewart et al. | 345/88 |

FOREIGN PATENT DOCUMENTS

| | | |
|---|---|---|
| 0185258 | 6/1986 | European Pat. Off. . |
| 2234093 | 1/1991 | United Kingdom . |

OTHER PUBLICATIONS

"Fundamental of Microprocessor Systems" by Witting, Hatfield Polytechnic Computer science Series, p. 445, 1984.

Computer Technik, Jul. 1987, Hanover, Germany, pp. 138–145, "Hochzeit zu dritt".

"Control Signals For Input/Output Bus of A Microprocessor", IBM Technical Disclosure Bulletin, vol. 23, No. 4, Sep. 1980, pp. 1607.

Intel MCS 80/85 Family User's Manual; pp. A-1-32-A-1-37, Intel Corporation, Jan. 1983.

Primary Examiner—Jack B. Harvey
Assistant Examiner—Valerie Darbe
Attorney, Agent, or Firm—Perman & Green, LLP

[57] ABSTRACT

A microprocessor controlled apparatus includes a microprocessor (2) with e.g. eight address lines ($A_0, A_1 \ldots A_7$) on which signals may be applied by the microprocessor for selectively addressing a peripheral device coupled thereto, and a data device such as a LCD module (1) having data lines to which data signals may be applied for transfer into the data device. Four of the data lines ($D_0, D_1, D_2, D_3$) are coupled to a sub-set of the microprocessor address lines ($A_2, A_3, A_4, A_5$) excluding the two address lines ($A_0, A_1$) associated with the least significant bits. The signals on the sub-set of address lines are thus applied as data signals to the data device. When data is to be transmitted to the data device the microprocessor (2) is caused to execute a sub-routine comprising instructions having addresses such that the signal appearing on the sub-set of address lines remains substantially stable over an extended period of time allowing data to be clocked into the device even when the write timing of the microprocessor is too fast for the device to accept data directly from the data output lines of the microprocessor.

32 Claims, 3 Drawing Sheets

Fig. 2.

| ADDRESS | | | S/ROUTINE | |
|---|---|---|---|---|
| 00 | 00 | 0000 | 00 | NOP ⎫ |
| 01 | 00 | 0000 | 01 | NOP ⎬ 1 |
| 02 | 00 | 0000 | 10 | NOP ⎪ |
| 03 | 00 | 0000 | 11 | RTS ⎭ |
| 04 | 00 | 0001 | 00 | NOP ⎫ |
| 05 | 00 | 0001 | 01 | NOP ⎬ 2 |
| 06 | 00 | 0001 | 10 | NOP ⎪ |
| 07 | 00 | 0001 | 11 | RTS ⎭ |
| 08 | 00 | 0010 | 00 | NOP ⎫ |
| 09 | 00 | 0010 | 01 | NOP ⎬ 3 |
| 10 | 00 | 0010 | 10 | NOP ⎪ |
| 11 | 00 | 0010 | 11 | RTS ⎭ |
| 12 | 00 | 0011 | 00 | NOP ⎫ |
| 13 | 00 | 0011 | 01 | NOP ⎬ 4 |
| 14 | 00 | 0011 | 10 | NOP ⎪ |
| 15 | 00 | 0011 | 11 | RTS ⎭ |
| 16 | 00 | 0100 | 00 | NOP ⎫ |
| 17 | 00 | 0100 | 01 | NOP ⎬ 5 |
| 18 | 00 | 0100 | 10 | NOP ⎪ |
| 19 | 00 | 0100 | 11 | RTS ⎭ |
| 20 | 00 | 0101 | 00 | NOP ⎫ |
| 21 | 00 | 0101 | 01 | NOP ⎬ 6 |
| 22 | 00 | 0101 | 10 | NOP ⎪ |
| 23 | 00 | 0101 | 11 | RTS ⎭ |
| 24 | 00 | 0110 | 00 | NOP ⎫ |
| 25 | 00 | 0110 | 01 | NOP ⎬ 7 |
| 26 | 00 | 0110 | 10 | NOP ⎪ |
| 27 | 00 | 0110 | 11 | RTS ⎭ |
| 28 | 00 | 0111 | 00 | NOP ⎫ |
| 29 | 00 | 0111 | 01 | NOP ⎬ 8 |
| 30 | 00 | 0111 | 10 | NOP ⎪ |
| 31 | 00 | 0111 | 11 | RTS ⎭ |

ADDRESS LINE: A7, A6, A5, A4, A3, A2, A1, A0

| ADDRESS | | | S/ROUTINE | |
|---|---|---|---|---|
| 32 | 00 | 1000 | 00 | NOP ⎫ |
| 33 | 00 | 1000 | 01 | NOP ⎬ 9 |
| 34 | 00 | 1000 | 10 | NOP ⎪ |
| 35 | 00 | 1000 | 11 | RTS ⎭ |
| 36 | 00 | 1001 | 00 | NOP ⎫ |
| 37 | 00 | 1001 | 01 | NOP ⎬ 10 |
| 38 | 00 | 1001 | 10 | NOP ⎪ |
| 39 | 00 | 1001 | 11 | RTS ⎭ |
| 40 | 00 | 1010 | 00 | NOP ⎫ |
| 41 | 00 | 1010 | 01 | NOP ⎬ 11 |
| 42 | 00 | 1010 | 10 | NOP ⎪ |
| 43 | 00 | 1010 | 11 | RTS ⎭ |
| 44 | 00 | 1011 | 00 | NOP ⎫ |
| 45 | 00 | 1011 | 01 | NOP ⎬ 12 |
| 46 | 00 | 1011 | 10 | NOP ⎪ |
| 47 | 00 | 1011 | 11 | RTS ⎭ |
| 48 | 00 | 1100 | 00 | NOP ⎫ |
| 49 | 00 | 1100 | 01 | NOP ⎬ 13 |
| 50 | 00 | 1100 | 10 | NOP ⎪ |
| 51 | 00 | 1100 | 11 | RTS ⎭ |
| 52 | 00 | 1101 | 00 | NOP ⎫ |
| 53 | 00 | 1101 | 01 | NOP ⎬ 14 |
| 54 | 00 | 1101 | 10 | NOP ⎪ |
| 55 | 00 | 1101 | 11 | RTS ⎭ |
| 56 | 00 | 1110 | 00 | NOP ⎫ |
| 57 | 00 | 1110 | 01 | NOP ⎬ 15 |
| 58 | 00 | 1110 | 10 | NOP ⎪ |
| 59 | 00 | 1110 | 11 | RTS ⎭ |
| 60 | 00 | 1111 | 00 | NOP ⎫ |
| 61 | 00 | 1111 | 01 | NOP ⎬ 16 |
| 62 | 00 | 1111 | 10 | NOP ⎪ |
| 63 | 00 | 1111 | 11 | RTS ⎭ |

ADDRESS LINE: A7, A6, A5, A4, A3, A2, A1, A0

MICROPROCESSOR CONTROLLED APPARATUS

CROSS-REFERENCE TO RELATED APPLICATIONS

This is a continuation of U.S. application Ser. No. 08/016,804, filed Feb. 11, 1993, now abandoned.

This invention relates to a microprocessor controlled apparatus having a peripheral data-receiving device coupled to the microprocessor.

BACKGROUND OF THE INVENTION

As is conventional in the microprocessor art, the term "line" as used in the present specification refers to an individual input/output interface of a microprocessor or other device, e.g. in the form of a terminal or a conductor connected to such a terminal, on which signals such as address or data signals may be applied, and the terms "address line" and "data line" are used accordingly.

A conventional microprocessor has a plurality of address lines on which signals may be applied by the microprocessor for selectively addressing a peripheral device coupled to the microprocessor. 8-bit microprocessors generally have 16 address lines allowing $2^{16}=65536$ address numbers, whereas newer 16-bit microprocessors have either 20 or 24 address lines allowing much greater amounts of memory to be addressed more easily.

Data-receiving devices, such as memories or display devices have a plurality of data lines for inputting data signals. Devices which are capable of accepting data at a very high rate may have the data lines connected directly to data output lines of the microprocessor. However, some data-receiving devices, such as for example a conventional liquid crystal display (LCD) module are not capable of accepting data at the fast write speeds associated with the high clock rates, e.g. 8 MHz, of current microprocessors. In this case, rather than slowing down the microprocessor clock, it is known to couple the data-receiving device to the microprocessor either via port lines on the microprocessor or to include a separate hardware latch which serves to slow down the rate at which data is input to the device.

SUMMARY OF THE INVENTION

According to the present invention there is provided a microprocessor controlled apparatus including a microprocessor having a plurality of address lines $(A_0, A_1, \ldots A_n)$ on which signals may be applied by the microprocessor for selectively addressing a peripheral device coupled thereto, and a data device including data lines $(D_0, D_1, \ldots D_m)$ to which data signals may be applied for transfer into the data device, wherein the data lines are coupled to a sub-set of the microprocessor address lines whereby the signals on the sub-set of address lines are applied as data signals to the data device.

Apparatus in accordance with the invention has the data lines of the data device coupled directly to a sub-set of the microprocessor address lines so that part of the address appearing on the address lines is applied directly as data to the data device. No latch is needed and since a latch is a separate hardware device, the cost and space associated with such a latch is saved. Moreover, there is no need to use microprocessor port lines to latch the data. Consequently the present apparatus configuration minimizes the overall number of microprocessor port lines required to interface the data-receiving device with the microprocessor. More port lines thus remain available for other uses.

Suitably the microprocessor is adapted to maintain a substantially stable signal on each of the sub-set of address lines while the signal on other of the address lines is changed. Hence the data signals applied to the data lines can be held at the same level over a period long enough to permit the data to be written into the data device.

In a preferred embodiment this is achieved by arranging that the microprocessor executes a sub-routine comprising instructions having addresses such that the signal appearing on the sub-set of address lines remains substantially stable during the execution of said sub-routine.

Generally the sub-set of address lines will exclude the address lines $(A_0, \ldots A_x)$ associated with the x least significant bits, where x is the number of digits in the binary representation of m+1, and m+1 is the number of data lines of the data device which are coupled to the sub-set of microprocessor address lines. In this way the signal applied to the address lines associated with the x least significant bits can be changed, specifically to increment the address and so execute the next instruction in the sub-routine, without changing the signal applied on the address lines coupled to the data lines of the data device.

In the particular case where the data device is configured to receive a 4-bit parallel input, the sub-set of address lines excludes the address lines $(A_0, A_1)$ associated with the two least significant bit positions. In this case the data device has four data lines $(D_0, D_1, D_2, D_3)$ coupled respectively to the address lines $(A_2, A_3, A_4, A_5)$ associated with the third to the sixth least significant bit positions.

In the case where the device is an 8-bit device, i.e. the device processes data received in blocks of eight bits, it is advantageous to apply data to four data lines of the device sequentially in two 4-bit segments or so-called "nibbles". This reduces the number of bus lines needed to connect to the data device.

Preferably the sub-routine executed by the sub-routine comprises m "no operation" instructions where the microprocessor proceeds to execute the next instruction in the sub-routine without performing any specific operation; where m is one less than the number of data lines coupled to the sub-set of microprocessor address lines. Thus, in the case of a data device having four data lines $(D_0, D_1, D_2, D_3)$ coupled respectively to the four address lines $(A_2, A_3, A_4, A_5)$ the sub-routine comprises three "no operation" instructions. The final instruction of the subroutine is an instruction to return to the main routine.

In a particular embodiment in which it is intended to write data into the data device, the data device includes a write line to which a write signal is applied from the microprocessor during the time the signals on the sub-set of address lines are held substantially stable whereby data is transferred to the data device from the data lines.

A microprocessor controlled apparatus in accordance with the invention has particular application where the maximum speed at which the data device can accept data is less than the speed at which the microprocessor outputs data, i.e. the write timing of the microprocessor which is determined by the microprocessor's clock rate. A liquid crystal display device is an example of such a data device where the applicant has found that the invention can be used advantageously.

BRIEF DESCRIPTION OF THE DRAWINGS

An embodiment of the invention will now be described, by way of example, with reference to the accompanying drawings, in which:

FIG. 2 is a listing of a set of sub-routines executed by the microprocessor in FIG. 1.

DETAILED DESCRIPTION OF THE INVENTION

Figure 1:
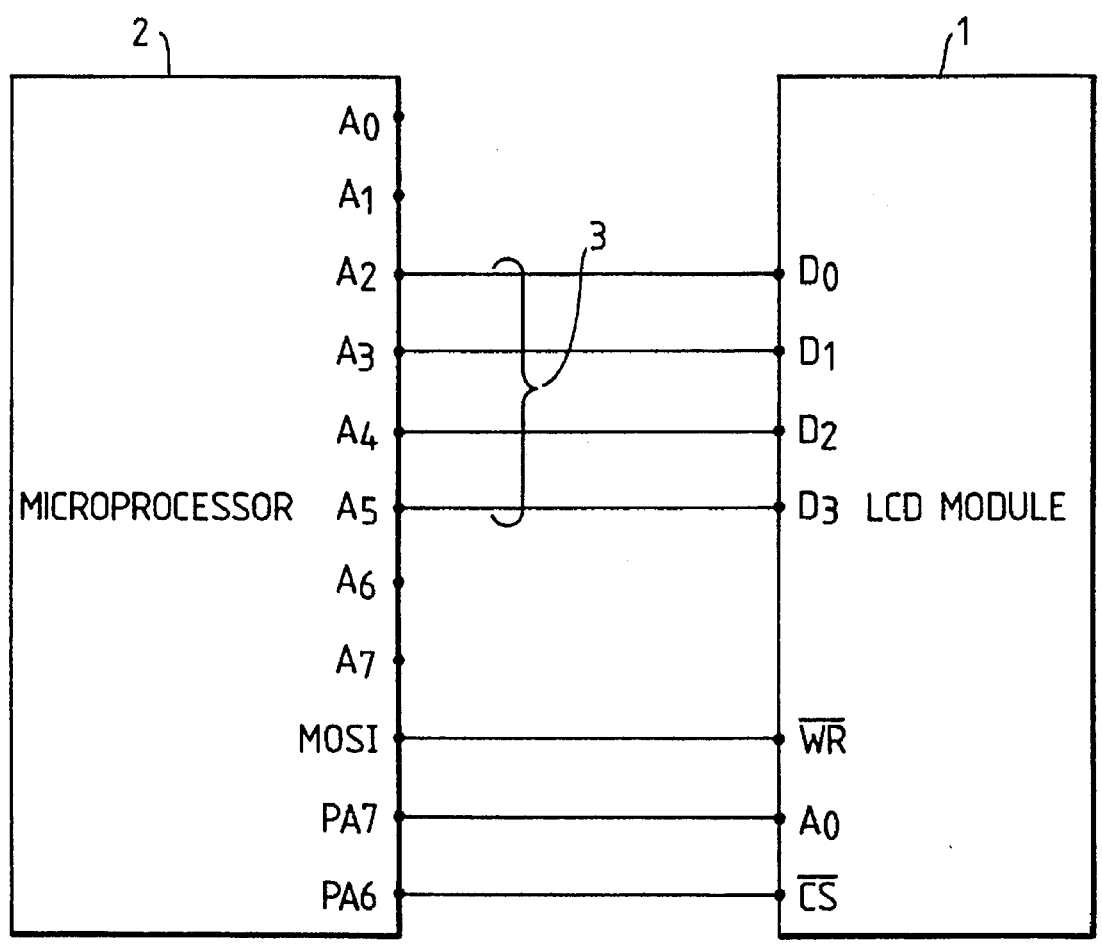
FIG. 1 is a schematic block diagram of a liquid crystal display (LCD) module coupled to a microprocessor in accordance with the invention.

Referring to FIG. 1, a data device in the form of an LCD module is coupled to a microprocessor 2. The LCD module is used for displaying alphanumeric data to a user in accordance with display and control data applied thereto, as described in more detail. The LCD may form part of a user-interface including additionally, for example, a data-input device (typically a keyboard) of an electronic apparatus such as a calculator or a radio telephone. The LCD module is itself a conventional device. For example, the Applicant has used a SED1200F available from Seiko Epson which is an 8-bit device, i.e. it processes data received in blocks of 8-bits.

The microprocessor 2 is also a conventional device and the Applicant has used a Hitachi 68HC11 device available from Hitachi Limited, Tokyo, Japan. This microprocessor is a 8-bit device having 16 address lines.

Other peripheral devices may also be coupled to the microprocessor 2 depending on the particular apparatus concerned.

In accordance with the present invention four of the data lines ($D_0, D_1, D_2, D_3$) of the LCD module are coupled to a sub-set of the micro-processor address lines ($A_2, A_3, A_4, A_5$) via a 4-line bus 3. Although the microprocessor has 16 address lines, only eight of these ($A_0, A_1 \ldots A_7$) are shown in FIG. 1, for the sake of clarity. As is conventional the address lines are coupled via address buses to the various peripheral devices whereby selected devices may be addressed by the microprocessor.

More specifically the data line $D_0$ of the LCD module 1 is coupled to the address line $A_2$ of the microprocessor 2; the data line $D_1$ is coupled to the address line $A_3$; the data line $D_2$ is coupled to the address line $A_4$; and the data line $D_3$ is coupled to the address line $A_5$. In this notation $A_0$ represents the address line associated with the least significant bit, $A_1$ represents the address line associated with the second least significant bit, and so on, i.e. the subscript indicates the bit position. Likewise $D_0$ represents the data line associated with the least significant bit, and $D_2$ represents the data line associated with the second least significant bit etc.

It is noted that none of the data lines is connected to the address lines $A_0, A_1$, associated with the two least significant bits.

As will be discussed in more detail below the write line WR of the LCD module 1 is coupled to the MASTER OUT/SLAVE IN (MOSI) line of the microprocessor 2. The MOSI line is part of the synchronous serial peripheral interface (SPI) function of the microprocessor. The mode line $A_0$ of the LCD module 1 is coupled to the output port PA7 of the microprocessor 2 and the chip select line CS of the LCD module 1 is coupled to the output port PA6 of microprocessor 2. PA6 and PA7 are single lines coupled with port A in the microprocessor. In general each of these lines may be configured as an input or an output. In the present case they are set as outputs.

When it is desired to write data to the LCD module 1 a "JUMP TO SUBROUTINE" instruction in the main programme directs the microprocessor to execute one of sixteen special sub-routines depending on the data value to be transmitted. The sixteen sub-routines, which are listed in FIG. 2, may be stored in EEPROM with the code for the main programme.

Each subroutine is 4 bytes long and comprises three identical NO-OPERATION (NOP) instructions followed by a "RETURN TO SUB-ROUTINE" (RTS) instruction. As shown in the timing diagram of FIG. 3, the duration of each NOP instruction is two clock cycles.

Exactly the same sub-routine, i.e. three NOP instructions and one RTS, is duplicated sixteen times in total and the sixty-four bytes of code are stored in consecutive address locations. As will become apparent from the following discussion the set of 16 sub-routines may be stored at any 64 byte boundary in the main program.

FIG. 2 shows the 8-bit address location of each sub-routine and of each instruction within the individual sub-routines. It can also be seen from FIG. 2 what state each address line $A_0, A_1 \ldots A_7$ of the microprocessor will be in when a particular instruction is being executed. Thus for example, when the instruction at address location $12_{10}= 00001100_2$ is being executed $A_0=0$; $A_1=0$; $A_2=1$; $A_3=1$; $A_4=0$; $A_5=0$; $A_6=0$; and $A_7=0$.

Moreover, it can be seen from FIG. 2 that during the execution of any one sub-routine the state of the lines $A_2, A_3, A_4, A_5$ remains stable throughout the whole sub-routine. Only the two least significant bits on the address lines $A_0, A_1$ change as the address is incremented during execution of the programme.

So, for example, the four bits 0011 will remain on the address lines for six clock cycles during the execution of the three NOP instructions starting at address location $12_{10}= 00001100_2$. The corresponding data lines $D_0, D_1, D_2, D_3$ of the LCD module to which the address lines ($A_2, A_3, A_4, A_5$) are coupled will thus be held stable for a period long enough to write the data to the LCD module, as explained in more detail below.

The LCD module has four data lines coupled to the microprocessor address lines and therefore it is possible to input sixteen combinations of data. It will be evident from FIG. 2 that any one of the sixteen combinations of data may be applied by executing the appropriate sub-routine having the desired bit configuration on the four inner address lines $A_2, A_3, A_4, A_5$. Thus for example, the bits 0101 will be applied to the data lines $D_0, D_1, D_2, D_3$ of the LCD module when the sub-routine at address location $20_{10}=00010100_2$ is executed. Likewise the bits 1110 will be applied to the data lines $D_0, D_1, D_2, D_3$ when the sub-routine starting at location $56_{10}=0011100$ is executed.

In view of the foregoing discussion it will be apparent that the 16 sub-routines may be located at any 64 byte boundary without affecting the stability of the four bits on the central address lines $A_2, A_3, A_4, A_5$. For example, if the 16 sub-routines start at address $64_{10}$ then the bit on address line $A_6$ would become 1, but otherwise the pattern would remain the same as in FIG. 2. Similarly if the 16 sub-routines start at any other address location which is a multiple of 64 the central four bits $A_2, A_3, A_4, A_5$ will remain stable throughout the execution of each four byte sub-routine.

Since the LCD module 1 used in this example is an 8-bit device, data is transmitted to the module on the four data lines in two successive 4-bit segments or so-called "nibbles".

Figure 3:
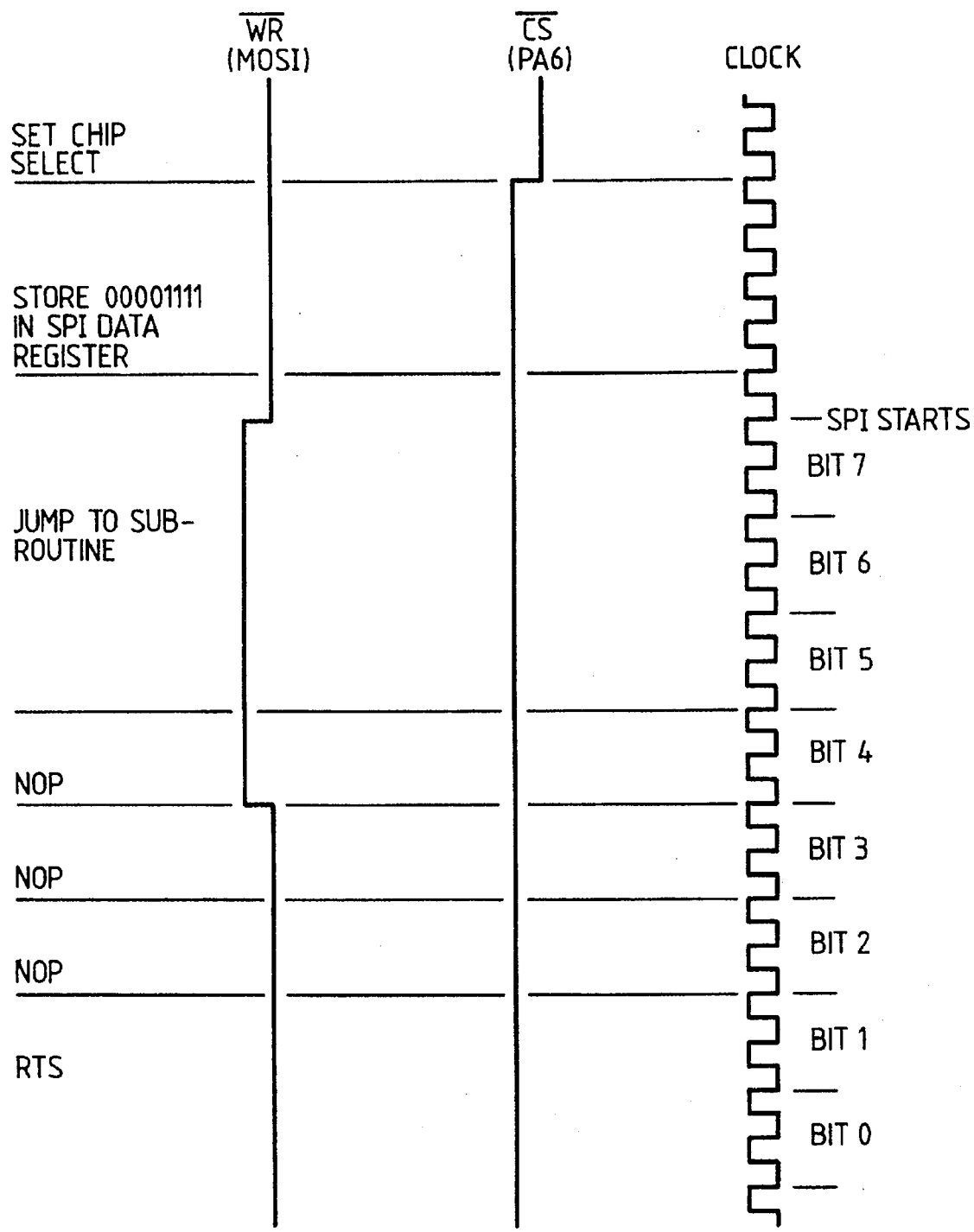
FIG. 3 is a diagram showing the timing of certain signals applied to the LCD module in FIG. 1.

The overall sequence for writing data to the LCD module will now be described, referring additionally to FIG. 3.

The $A_0$ line of the LCD module allows one of two modes to be selected, namely a display mode and a control mode. In the first mode the input data is displayed on the LCD as an alphanumeric character, in the second mode the input data determines which position on the LCD the data is displayed. The microprocessor output port PA7 is therefore set to select the appropriate mode.

In order that the LCD module is addressed the chip select line CS has to be set low for the duration of both write steps (i.e. writing both nibbles). Hence the microprocessor output port PA6 to which the chip select line is coupled is set low at the start of the write cycle (see FIG. 3).

Next, assuming that 8 bits of data are to be sent to the LCD, the upper nibble (4-bits) is masked, so that the lower nibble can be sent first to the LCD module. At this stage the program executed by the microprocessor jumps to the relevant sub-routine. The address of the respective sub-routine is calculated by multiplying the decimal version of the data value to be sent by 4 and adding as an offset the address location of the first sub-routine. So for example, if the first sub-routine is stored in location 00 (as shown in FIG. 2) and the data to be sent is 0011=3 the address location of the sub-routine is given by (3×4)+0=12. Hence the sub-routine at location 12 is executed which applies the bits 0011 on the address lines $A_5, A_4, A_3, A_2$ as can be seen from FIG. 2.

In order that the data applied to the data lines $D_0, D_1, D_2, D_3$ may be clocked into the LCD module it is necessary to apply a write pulse on write line WR during the execution of the sub-routine. More particularly the rising edge of the write pulse must occur mid-way through the execution of the three NOP instructions. It is not possible to apply the write pulse from any of the microprocessor ports because this will cause the address on the address lines to change thereby corrupting the data to the LCD module.

The write pulse is therefore generated using the serial peripheral interface (SPI) data line from the microprocessor 2, which is known as MOSI (MASTER OUT/SLAVE IN) in the Hitachi 68HC11 device used by the Applicant. As can be seen from FIG. 3, transmission of one data word is started on MOSI just before the call to the particular sub-routine containing the three NOP instructions. The value of the word is selected so that the levels it generates on the MOSI line corresponding to the write pulse on WR causes a rising edge to occur during the execution of the NOP instructions, i.e. during the time that the data on the data lines is held stable. The data word is stored in the SPI data register in the microprocessor and the SPI transfer is then initiated. Each digit of the word is transmitted over 2 clock cycles starting with the most significant bit first. For example the Applicant has used the data word 00001111 to generate a rising edge on the write pulse at the boundary between the first and second NOP instructions; as shogun in FIG. 3. In this case the rising edge occurs 8 clock cycles after the start of the SPI signal. The data on the lines $D_0, D_1, D_2, D_3$ is thus clocked into the LCD module and the sequence is then repeated to clock in the data of the lower nibble.

The whole process of transmitting data to the LCD module sequentially in two nibbles may then be repeated to write further data to the LCD module, either display or control data depending on the level of $A_0$/PA6 as mentioned above.

In view of the foregoing description it will be evident to a person skilled in the art that various modification may be made within the scope of the present invention. For example the invention is not restricted to data devices having four data lines. In this case of a device using eight data lines, these may be coupled to the address lines $(A_3, A_4 \ldots A_9)$ of the microprocessor, excluding the address lines $(A_0, A_1, A_2)$ associated with the three least significant bits. It will be understood that in this case 256 ($=2^8$) sub-routines are required, corresponding to 1 k byte of memory space, compared with only 64 bytes in the 4-line case. It will be apparent therefore that the arrangement using only 4 data lines is particularly advantageous since it is economic on the amount of memory required.

Furthermore the invention may be used with peripheral devices other than LCD modules, which require data to be written to them, particularly where the write timing of the microprocessor is too fast for the device to be coupled directly to the data output lines.

We claim:

1. A microprocessor controlled apparatus for providing signals to a device comprising:

a microprocessor having a plurality of dedicated address lines to which only address signals are applied during an instruction cycle, the microprocessor comprising means for maintaining all of the address signals on a sub-set of the address lines substantially constant between consecutive microprocessor instruction cycles; and a device for receiving signals on a plurality of data lines, the data lines being coupled to the sub-set of the microprocessor address lines for receiving data on the data lines from the sub-set of address lines during a device write operation that extends over a plurality of microprocessor instruction cycles.

2. A microprocessor controlled apparatus as claimed in claim 1, wherein the microprocessor is adapted to maintain a substantially stable signal on each of the sub-set of address lines while the signal on other of the address lines is changed.

3. A microprocessor controlled apparatus as claimed in claim 2, wherein the microprocessor is conditioned to execute a sub-routine comprising instructions having addresses such that the signal appearing on the sub-set of address lines remains substantially stable during the execution of said sub-routine.

4. A microprocessor controlled apparatus as claimed in claim 3, wherein the sub-routine comprises at least one "no operation" instruction.

5. A microprocessor controlled apparatus as claimed in claim 3, wherein the sub-routine comprises m "no operation" instructions.

6. A microprocessor controlled apparatus as claimed in claim 1, wherein the sub-set of address lines excludes the address lines $(A_0, \ldots A_x)$ associated with the x least significant bits, where x is the number of digits in the binary representation of m+1, and m+1 is the number of data lines of the data device which are coupled to the sub-set of microprocessor address lines.

7. A microprocessor controlled apparatus as claimed in claim 6, wherein the sub-set of address lines excludes the address lines $(A_0, A_1)$ associated with the two least significant bit positions.

8. A microprocessor controlled apparatus as claimed in claim 7, wherein the data device has four data lines $(D_0, D_1, D_2, D_3)$ coupled respectively to the address lines $(A_2, A_3, A_4, A_5)$ associated with the third to the sixth least significant bit positions.

9. A microprocessor controlled apparatus as claimed in claim 8, wherein the data device is an 8-bit device and data is applied to the four data lines sequentially in two 4-bit segments.

10. A microprocessor controlled apparatus as claimed in claim 1, wherein the data device includes a write line to which a write signal is applied from the microprocessor during the time the signals on the sub-set of address lines are held substantially stable whereby data is transferred to the data device from the data lines.

11. A microprocessor controlled apparatus as claimed in claim 1, wherein the maximum speed at which the data device can accept data is less than the microprocessor outputs data.

12. A microprocessor controlled apparatus as claimed in claim 1, wherein the data device comprises a liquid crystal display device.

13. A microprocessor controlled apparatus as claimed in claim 1 wherein the means for maintaining the signals maintains the address signals on the sub-set of address lines for a predetermined period of time sufficiently long for the device to read the signals.

14. A method of transmitting data information from a first electrical device to a second electrical device comprising steps of:
sending signals from the first device to the second device through a sub-set of first device dedicated address lines that convey only address information, the sub-set being less than a total number of the first device address lines;
maintaining the signals constant on all of the individual sub-set lines for a predetermined period of time while signals on other address lines of the first device change, wherein the signals on the sub-set lines are held at a constant level over the predetermined period of time to permit the signals to be written into the second device; and, in the second device,
interpreting the signals that are written into the device as data information, and not as address information.

15. In a data processing system having a memory comprised of a plurality of addressable storage locations for storing executable instructions, a digital data processor having a port comprised of a set of signal lines for outputting memory address signals for specifying individual ones of the addressable storage locations, and at least one device having a port comprised of at least one data signal line for inputting data, a method for inputting data to the device, comprising:
coupling a sub-set of the signal line set to the at least one data signal line;
executing, with the digital data processor, a plurality of instructions; and
during the execution of the plurality of instructions, triggering the device to input, on the at least one data signal line, the memory address signals that are output on the sub-set of the signal line set.

16. A method as set forth in claim 15, wherein the plurality of instructions are predeterminally stored in the memory such that the memory address signals that appear on the sub-set of the signal line set, during the execution of the plurality of instructions, remain constant.

17. A method as set forth in claim 15, wherein the memory stores a plurality of instruction sets each of which is comprised of a plurality of instructions, wherein individual ones of the plurality of instruction sets are aligned to a memory address boundary such that the memory address signals that appear on the sub-set of the signal line set, during the execution of the plurality of instructions, remain constant during the execution of instructions of a selected instruction set.

18. A method as set forth in claim 17, wherein an instruction set is selected for execution as a function of a value of data to be input to the device.

19. A method as set forth in claim 15, wherein the device includes a terminal for inputting a write signal, and wherein the step of triggering includes a step of activating the write signal during the execution of the plurality of instructions.

20. A method as set forth in claim 15, wherein the device includes a terminal for inputting a write signal, wherein the digital data processor includes a terminal for outputting a bit serial data signal, wherein the device write signal terminal is coupled to the processor bit serial data terminal, and wherein the step of triggering includes a step of activating the write signal during the execution of the plurality of instructions by outputting a predetermined bit serial data signal from the bit serial data terminal.

21. A data processing system, comprising:
a memory comprised of a plurality of addressable storage locations for storing executable instructions;
a digital data processor having a port comprised of a set of signal lines coupled to said memory for outputting memory address signals for specifying individual ones of the addressable storage locations; and
at least one device having a port comprised of data signal lines for inputting data, said data signal lines being coupled to a sub-set of the address signal line set; wherein
said digital data processor executes a plurality of instructions and, during the execution of the plurality of instructions, said device is triggered to input, on said data signal lines, the memory address signals that are output on the sub-set of the address signal line set.

22. A data processing system as set forth in claim 21, wherein the plurality of instructions are predeterminally stored in the memory such that the memory address signals that appear on the sub-set of the signal line set, during the execution of the plurality of instructions, remain constant.

23. A data processing system as set forth in claim 21, wherein the memory stores a plurality of instruction sets each of which is comprised of a plurality of instructions, wherein individual ones of the plurality of instruction sets are aligned to a memory address boundary such that the memory address signals that appear on the sub-set of the signal line set, during the execution of the plurality of instructions, remain constant during the execution of instructions of a selected instruction set.

24. A data processing system as set forth in claim 21, wherein the device includes a terminal for inputting a write signal that is activated to write data appearing on the data signal lines into the device, wherein the digital data processor includes a terminal for outputting a bit serial data signal, wherein the device write signal terminal is coupled to the processor bit serial data terminal, and wherein the digital data processor includes means for activating the write signal during the execution of the plurality of instructions by outputting a predetermined bit serial data signal from the bit serial data terminal.

25. A data processing system as set forth in claim 21, wherein the memory stores a plurality of instruction sets each of which is comprised of a plurality of instructions, wherein individual ones of the plurality of instruction sets are aligned to a memory address boundary such that the memory address signals that appear on the sub-set of the signal line set, during the execution of the plurality of instructions, remain constant during the execution of instructions of a selected instruction set and have a value that ranges at least from 00 to 11.

26. A data processing system as set forth in claim 21, wherein said device is a display device for a radio telephone.

27. A data processing system as set forth in claim 26, wherein the plurality of instructions are predeterminally stored in the memory such that the memory address signals that appear on the sub-set of the signal line set, during the execution of the plurality of instructions, remain constant.

28. A data processing system as set forth in claim 26, wherein the memory stores a plurality of instruction sets each of which is comprised of a plurality of instructions, wherein individual ones of the plurality of instruction sets are aligned to a memory address boundary such that the memory address signals that appear on the sub-set of the signal line set, during the execution of the plurality of instructions, remain constant during the execution of instructions of a selected instruction set.

29. A data processing system as set forth in claim 26, wherein the device includes a terminal for inputting a write signal, and wherein the step of causing the device to input the memory address signals includes a step of activating the write signal during the execution of the plurality of instructions.

30. In a data processing system having a memory comprised of a plurality of addressable storage locations for storing executable instructions, a digital data processor having a port comprised of a set of signal lines for outputting memory address signals for specifying individual ones of the addressable storage locations, and at least one device having a port comprised of at least one data signal line for inputting data, a method for inputting data to the device, comprising:

coupling a sub-set of the signal line set to the at least one data signal line;

executing, with the digital data processor, a plurality of instructions; and during the execution of the plurality of instructions, causing the device to input, on the at least one data signal line, the memory address signals that are output on the sub-set of the signal line set.

31. A data processing system, comprising:

a memory comprised of a plurality of addressable storage locations for storing executable instructions;

a digital data processor having a port comprised of a set of signal lines coupled to said memory for outputting memory address signals for specifying individual ones of the addressable storage locations; and at least one device having a port comprised of data signal lines for inputting data, said data signal lines being coupled to a sub-set of the address signal line set; wherein said digital data processor executes a plurality of instructions and, during the execution of the plurality of instructions, said device is caused to input, on said data signal lines, the memory address signals that are output on the sub-set of the address signal line set.

32. A system as set forth in claim 31, wherein said device is a display device for a radio telephone.

* * * * *